US012681486B2

(12) United States Patent
Yokoyama et al.

(10) Patent No.: US 12,681,486 B2
(45) Date of Patent: Jul. 14, 2026

(54) INFORMATION PROCESSING DEVICE AND MOVING OBJECT

(71) Applicant: TOYOTA JIDOSHA KABUSHIKI KAISHA, Toyota (JP)

(72) Inventors: Daiki Yokoyama, Miyoshi (JP); Yasuhiro Saito, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/731,746

(22) Filed: Jun. 3, 2024

(65) Prior Publication Data

US 2025/0093880 A1     Mar. 20, 2025

(30) Foreign Application Priority Data

Sep. 15, 2023    (JP) ................................. 2023-149684

(51) Int. Cl.
| | |
|---|---|
| *G05D 1/227* | (2024.01) |
| *G05D 107/70* | (2024.01) |
| *G05D 109/10* | (2024.01) |
| *G06V 20/52* | (2022.01) |

(52) U.S. Cl.
CPC ............. *G05D 1/227* (2024.01); *G06V 20/52* (2022.01); *G05D 2107/70* (2024.01); *G05D 2109/10* (2024.01); *G06V 2201/08* (2022.01)

(58) Field of Classification Search
CPC ............... G06V 2201/08; G06V 20/52; G05D 2111/10; G05D 1/227; G05D 2107/70; G05D 2109/10
See application file for complete search history.

(56) References Cited

U.S. PATENT DOCUMENTS

| | | | |
|---|---|---|---|
| 2007/0090688 A1* | 4/2007 | Haemmerling | ........ B62D 13/06 |
| | | | 303/7 |
| 2017/0320529 A1 | 11/2017 | Nordbruch | |
| 2019/0049948 A1* | 2/2019 | Patel | .................... G05D 1/0038 |
| 2019/0064801 A1* | 2/2019 | Frazzoli | .................. G05D 1/81 |
| 2020/0142395 A1* | 5/2020 | Delbari | ................. B60K 35/80 |

(Continued)

FOREIGN PATENT DOCUMENTS

| | | |
|---|---|---|
| JP | 2017-538619 A | 12/2017 |
| JP | 2021-060764 A | 4/2021 |

*Primary Examiner* — Navid Z. Mehdizadeh
*Assistant Examiner* — Caitlin R McCleary
(74) *Attorney, Agent, or Firm* — SoraIP, Inc.

(57) ABSTRACT

The information processing device includes: a manual command generation unit that generates a manual control command that defines a traveling motion of the moving object in response to an operation by an operator of the operator input device; an information acquisition unit that acquires detection information generated when the control of the remote manual driving mode in which the moving object travels in accordance with the manual control command is performed by the moving object in a period in which the moving object is detected to be in an assistance required state in which the travel assistance is required; an automatic command generation unit that generates an automatic control command for traveling the moving object without using the manual control command; and a transmission unit that sends at least the automatic control command to the moving object when the information acquisition unit acquires the detection information.

3 Claims, 10 Drawing Sheets

(56)                    References Cited

U.S. PATENT DOCUMENTS

| 2020/0333778 | A1* | 10/2020 | Lambert | .............. | G05D 1/0038 |
| 2021/0094589 | A1* | 4/2021 | Sarett | ................ | B60W 50/0225 |
| 2023/0176573 | A1* | 6/2023 | Kumavat | ............. | G05D 1/0027 |
| | | | | | 701/23 |

* cited by examiner

INFORMATION PROCESSING DEVICE AND MOVING OBJECT

CROSS-REFERENCE TO RELATED APPLICATION

This application claims priority to Japanese Patent Application No. 2023-149684 filed on Sep. 15, 2023, incorporated herein by reference in its entirety.

BACKGROUND

1. Technical Field

The present disclosure relates to information processing devices and moving objects.

2. Description of Related Art

Conventionally, a moving object that autonomously travels by remote control has been known in the art (Japanese Unexamined Patent Application Publication (Translation of PCT Application) No. 2017-538619 (JP 2017-538619 A)).

SUMMARY

There are cases where an operator remotely controls a moving object by operating an operator input device installed at a place different from the moving object. In such cases, the moving object may deviate from a predetermined target route or collide with a surrounding object due to an operation error of the operator. Therefore, travel assistance is desired that avoids the moving object from deviating from a target route or from colliding with a surrounding object when the moving object travels by remote control via the operator input device. Moreover, travel assistance is also desired that corrects undesired traveling even when the moving object deviates from a target route or collides with a surrounding object.

The present disclosure can be carried out in the following aspects.

(1) According to a first aspect of the present disclosure, an information processing device is provided.

The information processing device is used for traveling of a moving object that is movable by unmanned driving.

The information processing device includes:

a manual command generation unit configured to generate a manual control command according to an operation performed by an operator of an operator input device installed at a place different from the moving object, the manual control command being a command defining a traveling motion of the moving object;

an information acquisition unit configured to acquire detection information, the detection information being information that is generated when the moving object is detected to be in an assistance required state during a period in which control in a remote manual driving mode is performed in response to the manual control command, the assistance required state being a state in which the moving object requires travel assistance, and the remote manual driving mode being a mode in which the moving object travels according to the manual control command;

an automatic command generation unit configured to generate an automatic control command, the automatic control command being a command to cause the moving object to travel without using the manual control command; and a transmission unit configured to send at least the automatic control command to the moving object when the information acquisition unit acquires the detection information.

There are cases where the moving object goes into the assistance required state due to an operation error of the operator during the period in which the control in the remote manual driving mode is performed. In such cases, according to the above aspect, the information processing device can acquire the detection information and send the automatic control command to the moving object in the assistance required state. With this configuration, when the moving object goes into the assistance required state, the information processing device can cause the moving object to travel using the automatic control command without using the manual control command according to an operation of the operator. The information processing device can thus assist in traveling of the moving object when the moving object is in the assistance required state. Specifically, the information processing device can reduce the possibility of the moving object deviating from a target route or colliding with a surrounding object due to, for example, an operation error of the operator. For example, there are also cases where the moving object deviates from a target route or collides with a surrounding object due to an operation error of the operator. In such cases as well, the information processing device can assist in traveling of the moving object in order to correct undesired traveling of the moving object.

(2) In the above aspect, when the information acquisition unit acquires the detection information, the transmission unit may perform either or both of a first process of sending the automatic control command to the moving object without sending the manual control command to the moving object, and a second process of sending the manual control command, the automatic control command, and supplementary information to the moving object, the supplementary information being information for instructing the moving object to preferentially use the automatic control command over the manual control command.

According to this aspect, when the information processing device acquires the detection information, the information processing device can perform the first process and can thus send the automatic control command to the moving object in the assistance required state without sending the manual control command. When the information processing device acquires the detection information, the information processing device can perform the second process and can thus send the manual control command, the automatic control command, and the supplementary information to the moving object in the assistance required state. With this configuration, the information processing device can instruct the moving object to preferentially use the automatic control command over the manual control command.

(3) According to a second aspect of the present disclosure, a moving object is provided.

The moving object that is movable by unmanned driving includes a control device configured to control a traveling motion of the moving object.

When the control device receives both a manual control command and an automatic control command, the control device preferentially uses the automatic control command over the manual control command.

The manual control command is a command generated according to an operation performed by an operator of an operator input device installed at a place different from the moving object, and defining the traveling motion of the moving object.

The automatic control command is a command generated to cause the moving object to travel without using the manual control command.

According to this aspect, when the control device of the moving object receives both the manual control command and the automatic control command, the control device can preferentially use the automatic control command over the manual control command.

(4) According to a third aspect of the present disclosure, a moving object is provided. The moving object that is movable by unmanned driving includes a control device configured to control a traveling motion of the moving object.

When the control device receives a manual control command, an automatic control command, and supplementary information, the control device preferentially uses the automatic control command over the manual control command.

The manual control command is a command generated according to an operation performed by an operator of an operator input device installed at a place different from the moving object, and defining the traveling motion of the moving object.

The automatic control command is a command generated by an information processing device to cause the moving object to travel without using the manual control command, the information processing device being a device installed at a place different from the moving object.

The supplementary information is information for the information processing device to instruct the moving object to preferentially use the automatic control command over the manual control command.

According to this aspect, when the control device of the moving object receives the manual control command, the automatic control command, and the supplementary information, the control device can preferentially use the automatic control command over the manual control command.

The present disclosure can be implemented in various forms other than the information processing device and the moving objects. The present disclosure can be implemented in the form of, for example, an information processing system including the information processing device and the moving object. The present disclosure can also be implemented in the form of, for example, an information processing method and a method for manufacturing the information processing device and the moving object. The present disclosure can also be implemented in the form of, for example, a control method for the information processing device and the moving object, a computer program that implements the control method, and a non-transitory recording medium recording the computer program.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
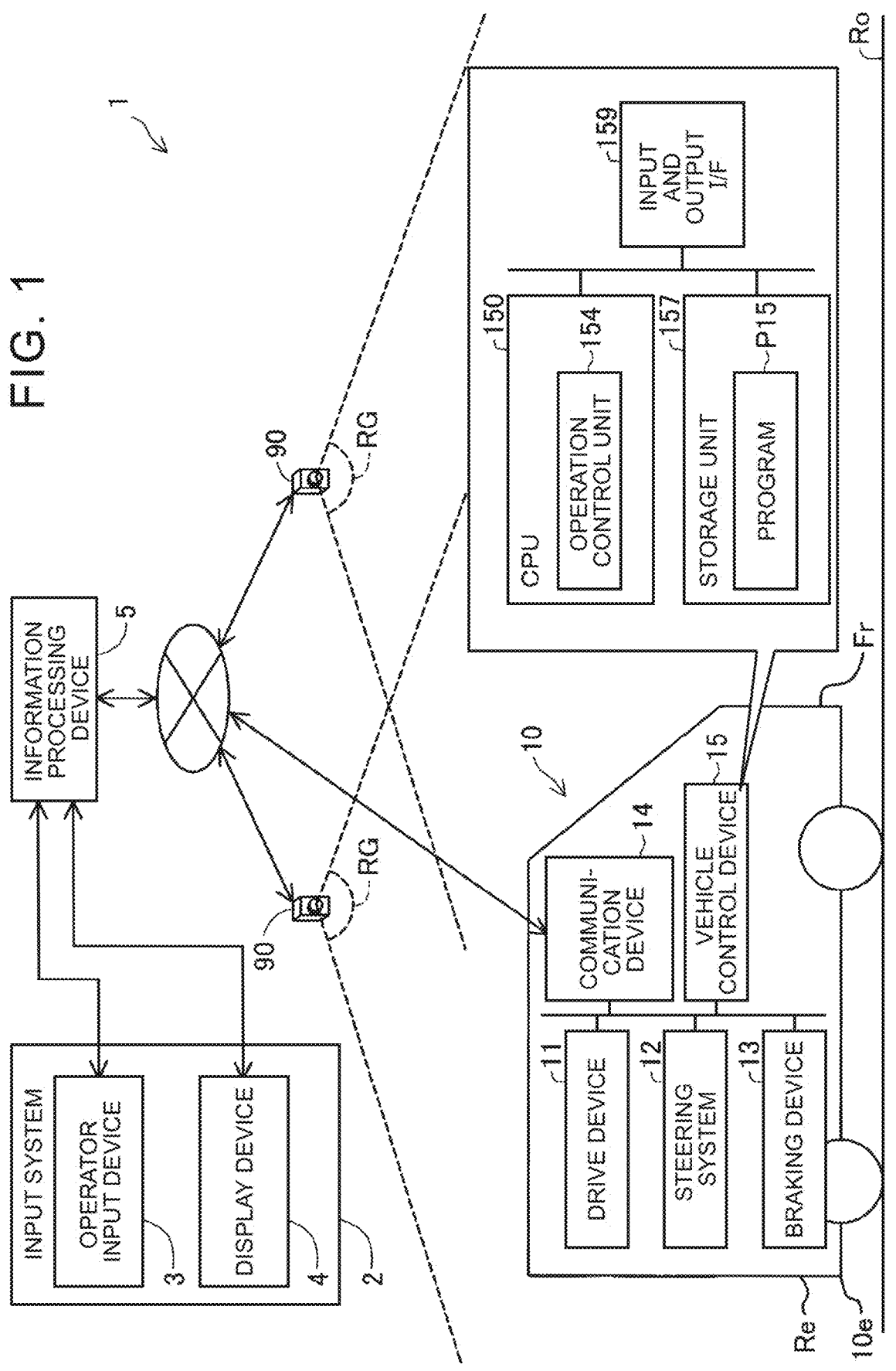
FIG. 1 is a diagram illustrating a configuration of an information processing system according to a first embodiment.

FIG. 1 is a diagram illustrating a configuration of an information processing system 1 according to a first embodiment. The information processing system 1 assists in traveling of the moving object or corrects the traveling failure of the moving object when the moving object remotely controlled by the operator from a place different from the moving object is in an assistance required state requiring the travel assistance. The assistance required state is, for example, at least one of a deviation prediction state, a deviation state, a collision prediction state, and a collision state. The deviation forecast state is a state in which the moving object is foreseen to deviate from a predetermined target route when the traveling is continued according to the current traveling condition. The traveling condition is a condition that defines the traveling motion of the moving object. The traveling condition includes a plurality of elements that define the traveling motion of the moving object. The traveling condition includes, for example, an acceleration and a steering angle of the moving object as elements that define the traveling motion of the moving object. The deviation state is a state in which the moving object deviates from the target path. The collision prediction state is a state in which the moving object is predicted to collide with an object (hereinafter, an obstacle) existing around the moving object when the traveling is continued according to the current traveling condition. The collision state is a state in which the moving object collides with an obstacle. The information processing system 1 includes one or more moving objects, a sensor, an input system 2, and an information processing device 5.

The "moving object" means an object that can move, such as a vehicle 10 or an electric vertical takeoff and landing machine (so-called flying vehicle). In the present embodiment, the moving object is the vehicle 10. The vehicle 10 may be a vehicle traveling by a wheel or a vehicle traveling by an infinite track, and is, for example, a passenger car, a truck, a bus, a two-wheeled vehicle, a four-wheeled vehicle, a tank, a construction vehicle, or the like. Vehicles 10 include battery electric vehicle (BEV), gasoline-powered vehicles, hybrid electric vehicle, and fuel cell electric vehicle. When the moving object is other than the vehicle 10, the expressions of "vehicle" and "vehicle" in the present disclosure can be appropriately replaced with "moving object", and the expression of "traveling" can be appropriately replaced with "moving".

The vehicle 10 includes a drive device 11, a steering device 12, a braking device 13, a communication device 14, and a vehicle control device 15. The drive device 11 accelerates the vehicle 10. The steering device 12 changes the traveling direction of the vehicle 10. The braking device 13 decelerates the vehicle 10. The communication device 14 communicates with an external device using wireless communication or the like. The external device is another device such as the information processing device 5 and the other vehicle 10. The communication device 14 is, for example, a wireless communication device. The vehicle control device 15 controls the traveling motion of the vehicle 10. The vehicle control device 15 includes a CPU 150, an input/output interface 159, and a storage unit 157. The input/output interface 159 is used to communicate with various devices mounted on the host vehicle 10. The storage unit 157 of the vehicle control device 15 stores various types of information including various types of program P15 for controlling the operation of the vehicle control device 15. CPU 150 of the vehicle-control device 15 functions as the operation control unit 153 by expanding various program P15 stored in the storage unit 157. The operation control unit 153 controls the operation of the actuator that changes the acceleration/deceleration and the steering angle of the vehicle 10, thereby performing the operation control of the vehicle 10. The "driving control" is various controls for driving an actuator that performs three functions of "running", "bending", and "stopping" of the vehicle 10, such as adjustment of acceleration, speed, and steering angle of the vehicle 10. In the present embodiment, the actuator includes an actuator of the drive device 11, an actuator of the steering device 12, and an actuator of the braking device 13.

The vehicle 10 can travel by unmanned driving. The term "unmanned driving" means driving that does not depend on the driving operation of the passenger. The driving operation means an operation related to at least one of "running", "turning", and "stopping" of the vehicle 10. The unmanned driving is realized by automatic and manual remote control using a device provided outside the vehicle 10 or autonomous control of the vehicle 10. A passenger who does not perform a driving operation may be on the vehicle 10 traveling by the unmanned driving. The passenger who does not perform the driving operation includes, for example, a person who is simply seated on the seat of the vehicle 10, and a person who performs a work different from the driving operation such as assembling, inspecting, and operating switches while riding on the vehicle 10. Driving by the driver's driving operation is sometimes referred to as "manned driving". In the present embodiment, the vehicle 10 is remotely controlled by the information processing device 5 and travels in the factory by unmanned driving. Note that the configuration of the vehicle 10 is not limited to the above.

The sensor acquires information for detecting that the vehicle 10 is in an assistance required state. In the present embodiment, the sensor is a camera 90 (hereinafter, referred to as an external camera 90) as an external sensor installed at a place different from the vehicle 10. The external camera 90 is a camera that captures a detection range RG including the vehicle 10 from the outside of the vehicle 10. In order to capture the entire track Ro with one or more external cameras 90, the installation position and the installation count of the external cameras 90 are determined by considering the detection range RG (angle of view) of the external cameras 90 and the like.

The input system 2 is a system for an operator to remotely control the traveling motion of the vehicle 10. The input system 2 includes an operator input device 3 and a display device 4.

The operator input device 3 is an input device for the operator to remotely control the traveling motion of the vehicle 10. The operator input device 3 is installed at a place different from the vehicle 10. The operator input device 3 is communicably connected to the information processing device 5. The operator input device 3 includes one or more input operation units. The operator input device 3 includes, for example, a steering wheel, an accelerator pedal, and a brake pedal as input operation units. The steering wheel changes the traveling direction of the vehicle 10 by remote control. The accelerator pedal accelerates the vehicle 10 by remote control. The brake pedal decelerates the vehicle 10 by remote control. The configuration of the operator input device 3 is not limited to the above. The operator input device 3 may include, for example, a push button switch or a lever switch as an input operation unit.

The display device 4 is used to visually recognize a surrounding situation of the vehicle 10 to be controlled when the operator operates the operator input device 3. The display device 4 includes a display screen. The display device 4 is arranged at a position where an operator can visually recognize the display screen. For example, captured images acquired by cameras that include a peripheral area of the vehicle 10 to be controlled in at least the detection range RG are displayed on the display screen. The captured image is one of an original image as raw data acquired by the camera and a processed image obtained by processing the original image.

Figure 2:
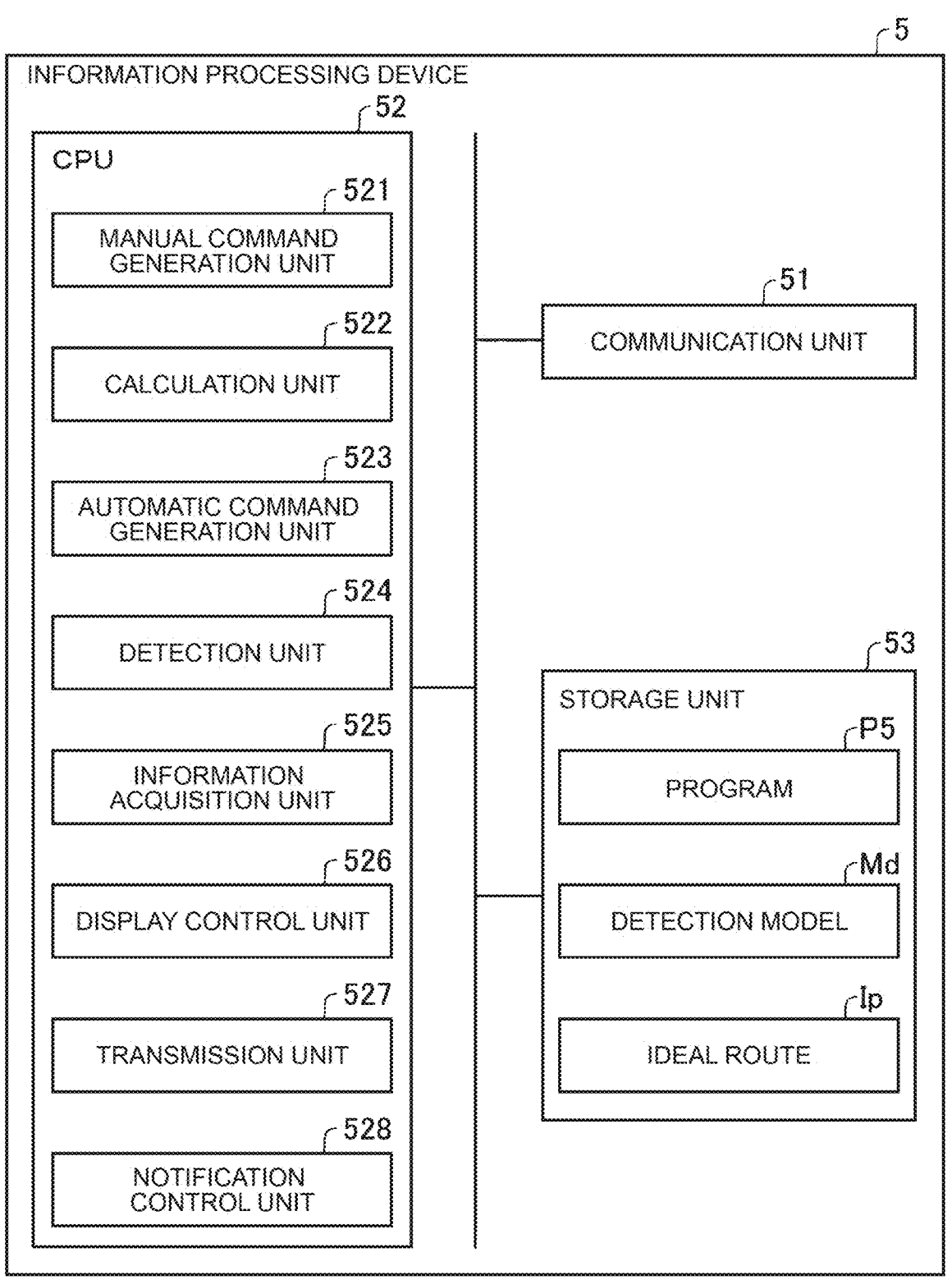
FIG. 2 is a diagram illustrating a configuration of an information processing device according to the first embodiment.

FIG. 2 is a diagram illustrating a configuration of the information processing device 5 according to the first embodiment. The information processing device 5 is used for traveling of the vehicle 10. The information processing device 5 includes a communication unit 51, a CPU 52, and a storage unit 53. In the information processing device 5, the communication unit 51, CPU 52, and the storage unit 53 are connected to each other via, for example, an internal bus.

The communication unit 51 of the information processing device 5 communicably connects the information processing device 5 to devices other than the information processing device 5. The communication unit 51 of the information processing device 5 is, for example, a wireless communication device.

The storage unit 53 of the information processing device 5 stores various types of information including various program P5 for controlling the operation of the information processing device 5, the detection model Md, and the ideal route Ip. The detection-model Md and the ideal route Ip will be described later. The storage unit 53 of the information processing device 5 includes, for example, a RAM, a ROM, and a hard disk drive (HDD).

The CPU 52 of the information processing device 5 functions as a manual command generation unit 521, a calculation unit 522, an automatic command generation unit 523, and a detection unit 524 by expanding various types of program P5 stored in the storage unit 53. Further, the CPU 52 of the information processing device 5 functions as an information acquisition unit 525, a display control unit 526, a transmission unit 527, and a notification control unit 528 by loading various program P5 stored in the storage unit 53.

The manual command generation unit 521 generates a manual control command that defines the traveling motion of the vehicle 10 in response to an operation by the operator of the operator input device 3. Hereinafter, a driving mode in which the vehicle 10 travels in accordance with the manual control command by the vehicle control device 15 of the vehicle 10 receiving the manual control command and controlling the actuator in accordance with the manual control command is referred to as a "remote manual driving mode". In the present embodiment, the manual control command is a manual control signal including the acceleration and the steering angle of the vehicle 10 as parameters. In other embodiments, the manual control signal may include the speed of the vehicle 10 as a parameter.

The calculation unit 522 calculates the position of the vehicle 10. In the present embodiment, the calculation unit 522 calculates the position of the vehicle 10 using the captured image acquired by the external camera 90. For example, the calculation unit 522 calculates the coordinates of the positioning point 10*e* of the vehicle 10 in the image coordinate system by using the appearance-shape of the vehicle 10 detected from the captured image. Then, the calculation unit 522 calculates the position of the vehicle 10 by converting the calculated coordinates into coordinates in the global coordinate system. In the present embodiment, the position data of the vehicles 10 includes the coordinates of X, Y, Z in the global coordinate system of the plant.

The external shapes of the vehicles 10 included in the captured images can be detected by, for example, inputting the captured images to a detection-model Md utilizing artificial intelligence. The detection model Md may be, for example, a learned machine learning model learned to implement either semantic segmentation or instance segmentation. As the detection-model Md, for example, a convolutional neural network (hereinafter referred to as CNN) learned by supervised learning using a training data-set can be used. The training data set includes, for example, a plurality of training images including the vehicle 10, and a correct label indicating which of an area indicating the vehicle 10 and an area indicating other than the vehicle 10 each area in the training image is. When CNN is learned, the parameters of CNN are preferably updated by back propagation so as to reduce the error between the output by the detection-model Md and the correct label.

The calculation unit 522 may further calculate the direction of the vehicle 10. The orientation of the vehicle 10 can be estimated based on the orientation of the movement vector of the vehicle 10 calculated from the positional change of the feature point of the vehicle 10 between the frames of the captured image, for example, using the optical flow method. The direction of the vehicle 10 may be calculated using, for example, an output result of a yaw rate sensor or the like mounted on the vehicle 10.

The automatic command generation unit 523 generates an automatic control command for causing the vehicle 10 to travel without using the manual control command. In the present embodiment, the automatic control command is an automatic control signal including the acceleration and the steering angle of the vehicle 10 as parameters. In order to generate an automatic control signal, the automatic command generation unit 523 first determines a target position to which the vehicle 10 should be directed next. In the present embodiment, the target position is represented by the coordinates of X, Y, Z in the global coordinate system of the plant. The automatic command generation unit 523 uses the position information of the vehicle 10 and the ideal route Ip stored in advance in the storage unit 53 of the information processing device 5 to determine the target position to which the vehicle 10 should be directed next. The ideal route Ip is a route on which the vehicles 10 should travel. The route is represented by a node indicating a starting point, a node indicating a passing point, a node indicating a destination, and a link connecting the respective nodes. The automatic command generation unit 523 determines the target position on the ideal route Ip ahead of the present position of the vehicles 10. The automatic command generation unit 523 generates an automatic control signal for causing the vehicle 10 to travel toward the determined target position. The automatic command generation unit 523 calculates the traveling speed of the vehicle 10 from the transition of the position of the vehicle 10, and compares the calculated traveling speed with a predetermined target speed of the vehicle 10. The automatic command generation unit 523 determines acceleration so that the vehicle 10 accelerates when the traveling speed is lower than the target speed, and determines acceleration so that the vehicle 10 decelerates when the traveling speed is higher than the target speed. When the vehicle 10 is located on the ideal route Ip, the automatic command generation unit 523 determines the steering angle so that the vehicle 10 does not deviate from the ideal route Ip. When the vehicle 10 is not located on the ideal route Ip, in other words, when the vehicle 10 deviates from the ideal route Ip, the automatic command generation unit 523 determines the steering angle so that the vehicle 10 returns to the ideal route Ip. In this way, the automatic command generation unit 523 generates a travel control signal including the acceleration and the steering angle of the vehicle 10 as parameters. In other embodiments, the automatic control signal may include the speed of the vehicle 10 as a parameter.

The detection unit 524 detects that the vehicle 10 is in the assistance required state during the period in which the control of the remote manual driving mode is performed, and generates detection information. The detection information is information indicating the vehicle 10 that is in the assistance required state during the period in which the control of the remote manual driving mode is performed. The detection unit 524 uses the sensor information acquired by the sensor to detect that the vehicle 10 is in the assistance required state. In the present embodiment, the detection unit 524 analyzes the captured image output from the external camera 90 to determine whether the vehicle 10 is in the assistance required state, using the position of the vehicle 10 calculated by the calculation unit 522. The information acquisition unit 525 acquires detection information generated by the detection unit 524.

The display control unit 526 controls display contents to be displayed on the display screen. In the present embodiment, the display control unit 526 causes the external camera 90 to display on a display screen a processed image obtained by processing the original image obtained by imaging the vehicle 10 and the surrounding area as a control target. Note that the display control unit 526 may display the captured image acquired by the in-vehicle camera mounted on the vehicle 10 to be controlled on the display screen in addition to or instead of the captured image acquired by the external camera 90.

The transmission unit 527 sends a control command to the vehicle 10. Specifically, in a case where the information acquisition unit 525 acquires the detection information during the period in which the control of the remote manual driving mode is being performed, the transmission unit 527 sends at least the automatic control command to the vehicle 10 that has been in the assistance required state. In the present embodiment, when the information acquisition unit 525 does not acquire the detection information during the period in which the control of the remote manual driving mode is being performed, the transmission unit 527 sends a manual control signal to the vehicle 10. On the other hand, the information acquisition unit 525 may acquire the detection information during a period in which the control of the remote manual driving mode is performed. In this case, the transmission unit 527 performs the first process of sending the automatic control signal to the vehicle 10 that has been in the assistance required state without sending the manual control signal.

The notification control unit 528 notifies the operator that the vehicle 10 is traveling using the automatic control signal during a period in which the vehicle 10 is traveling using the automatic control signal. In the present embodiment, when the transmission unit 527 sends the automatic control signal to the vehicle 10, the notification control unit 528 displays the automatic control information on the display screen. The automatic control information is information indicating the vehicle 10 traveling by using the automatic control signal. Note that the notification control unit 528 may, for example, emit a voice such as a message or the like directed to the operator from a speaker provided in one of the operator input device 3 and the display device 4. Thus, the notification control unit 528 may notify the operator that the vehicle 10 is traveling in accordance with the automatic control signal.

Note that the configuration of the information processing device 5 is not limited to the above. Each unit of the information processing device 5 may be configured separately by a plurality of devices, or may be realized as a function of another device such as a sensor. Each unit of the information processing device 5 may be realized by, for example, cloud computing constituted by one or more computers. Further, at least a part of the functions of the information processing device 5 may be one function of the vehicle control device 15.

Figure 3:
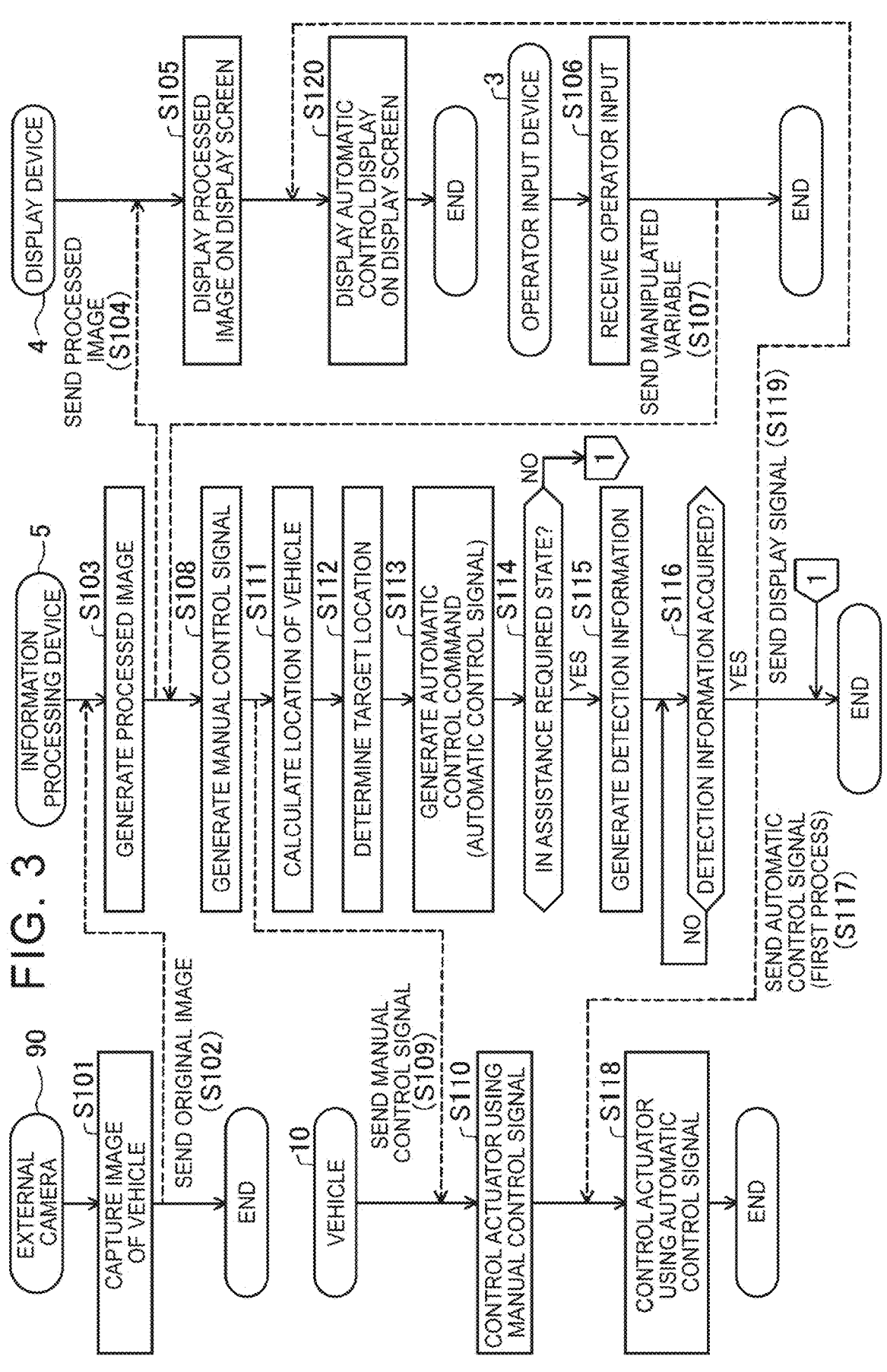
FIG. 3 is a flowchart showing a processing flow in the first embodiment.

FIG. 3 is a flowchart illustrating a processing flow in the first embodiment. Each step illustrated in FIG. 3 is repeatedly performed at predetermined time intervals, for example, in a period in which the control of the remote manual driving mode is performed.

In S101, the external camera 90 acquires an original image by capturing an image of the vehicle 10 to be controlled. In S102, the external camera 90 sends the original image to the information processing device 5. In S103, the display control unit 526 of the information processing device 5 generates a processed image obtained by performing processing such as distortion correction and noise removal on the original image acquired from the external camera 90. In S104, the display control unit 526 sends the processed images to the display device 4. In S105, the display device 4 displays the processed images on the display screen. In S106, the operator input device 3 receives an input from an operator. In S107, the operator input device 3 sends the operation amounts of the input operation units to the information processing device 5. In S108, the manual command generation unit 521 of the information processing device 5 generates a manual control signal. The manual control signal indicates an acceleration corresponding to the operation amount of the accelerator pedal and the brake pedal of the operator input device 3 and a steering angle corresponding to the operation amount of the steering wheel of the operator input device 3. In S109, the transmission unit 527 sends a manual control signal to the vehicle 10 to be controlled. In S110, the operation control unit 153 of the vehicle control device 15 mounted on the vehicle 10 controls the actuator by using the received manual control signal, thereby causing the vehicle 10 to travel at the acceleration and the steering angle represented by the manual control signal. The operation control unit 153 repeats the reception of the manual control signal and the control of the actuator at a predetermined cycle.

In S111, the calculation unit 522 of the information processing device 5 calculates the position of the vehicle 10 to be controlled by using the captured images. In S112, the automatic command generation unit 523 determines the target position to which the vehicle 10 should be directed next, using the position information of the vehicle 10 and the ideal route Ip. In S113, the automatic command generation unit 523 generates an automatic control signal for causing the vehicle 10 to travel toward the determined target position.

In S114, the detection unit 524 determines whether the vehicle 10 is in the assistance required state by using the position information of the vehicle 10. When it is determined that the vehicle 10 is in the assistance required state (S114: Yes), the detection unit 524 generates detection information in S115. When the information acquisition unit 525 acquires the detection information (S116: Yes), in S117, the transmission unit 527 sends an automatic control signal to the vehicles 10 that are in the assistance required state.

In S118, the operation control unit 153 of the vehicle control device 15 mounted on the vehicle 10 controls the actuator by using the received automatic control signal, thereby causing the vehicle 10 to travel at the acceleration and the steering angle represented by the automatic control signal. The operation control unit 153 repeatedly receives the control signal and controls the actuator at a predetermined cycle.

In S119, the notification control unit 528 of the information processing device 5 sends a display signal for displaying the automatic control display on the display screen of the display device 4 to the display device 4. In S120, the display device 4 displays an automatic control display on the display screen. Note that the information processing device 5 may cause the vehicle 10 to travel again by the manual control signal and may cause the vehicle 10 to continue to travel by the automatic control signal when the assistance required state is eliminated.

Figure 4:
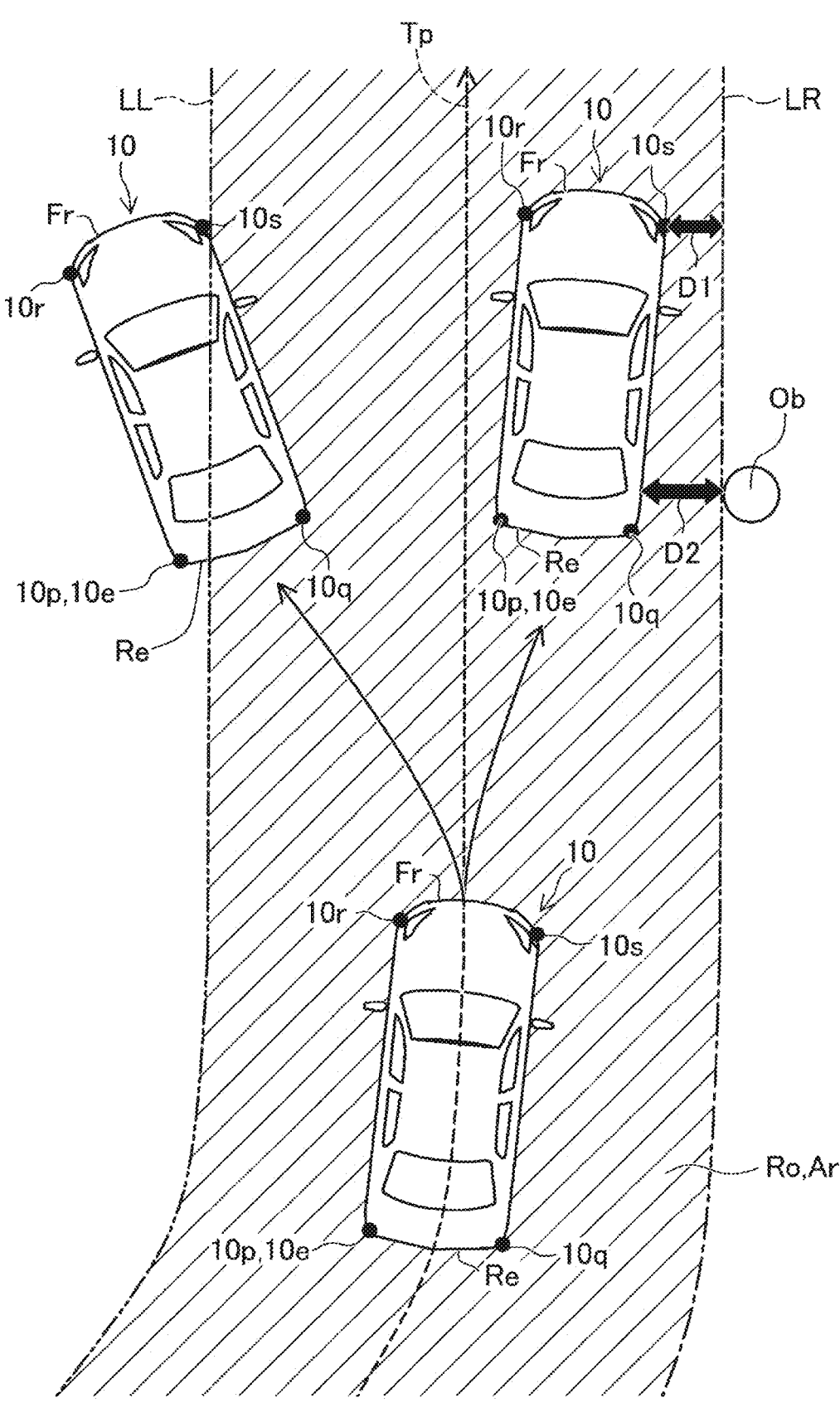
FIG. 4 is a diagram illustrating an example of a determination method for determining whether a moving object is in an assistance required state.

FIG. 4 is a diagram illustrating an example of a determination method for determining whether the vehicle 10 is in the assistance required state by using the location of the vehicle 10. The two virtual determination lines LL, LR are virtual lines that do not actually exist in the track Ro for determining whether the vehicle 10 is in at least one of a deviation forecast state and a deviation state. Each of the two virtual determination lines LL, LR is generated based on the ideal route Ip. Each of the two virtual determination lines LL, LR is parallel to an n-th order function (n is an integer equal to or greater than 1) indicating an ideal route Ip. The two virtual determination lines LL, LR are in line-symmetric positional relation with respect to the ideal route Ip. In FIG. 4, an area Ar (hereinafter, referred to as a partitioned area Ar) partitioned by two virtual determination lines LL, LR is hatched.

The detection unit 524 determines, based on the position of the vehicle 10 with respect to the virtual determination line LL, LR, whether the vehicle 10 is in at least one of a deviation prediction state and a deviation state. Specifically, the detection unit 524 determines whether or not the vehicle 10 is located in the partitioned area Ar by using the relative positional relation between the respective parts 10*p* to 10*s* of the vehicle 10 and the positioning point 10*e* and the vehicle coordinate points. The vehicle coordinate point is a coordinate point indicating the position of the vehicle 10. The respective parts 10p to 10s of the vehicle 10 are, for example, a left rear end 10p, a right rear end 10q, a left front end 10r, and a right front end 10s of the vehicle 10. When determining that the vehicle 10 is located within the partitioned area Ar, the detection unit 524 calculates the shortest-distance D1 between the vehicle 10 and the virtual determination line LL, LR. Detection unit 524, when the shortest distance D1 between the vehicle 10 and the virtual determination line LL, LR is less than the first distance predetermined, the detection unit 524 determines the vehicle 10 is a deviation foresight state. On the other hand, when the shortest distance D1 between the vehicle 10 and the virtual determination line LL, LR is equal to or greater than the first distance, the detection unit 524 determines that the vehicle 10 is not in a deviation prediction condition. In addition, the detection unit 524 determines that the vehicle 10 is in a deviation condition in at least one of a case where it is determined that the vehicle 10 is located outside the partitioned area Ar and a case where it is determined that the vehicle 10 is located on the virtual determination line LL, LR. The case where the vehicle 10 is located on the virtual determination line LL, LR indicates a case where the shortest-distance D1 between the vehicle 10 and the virtual determination line LL, LR is 0.

The detection unit 524 determines, based on the position of the vehicle 10, whether the vehicle 10 is in a collision prediction state or a collision state. Specifically, the detection unit 524 determines whether the vehicle 10 is in any one of the collision prediction state and the collision state by using the relative positional relation between the respective parts 10p to 10s of the vehicle 10 and the positioning point 10e, the vehicle coordinate point, and the object coordinate point. The object coordinate point is a coordinate point indicating the position of the obstacle Ob. The object coordinate points are represented by coordinate values in a global coordinate system. The detection unit 524 calculates the shortest distance D2 between the vehicles 10 and the obstacle Ob. When the shortest distance D2 between the vehicle 10 and the obstacle Ob is less than the predetermined second distance, the detection unit 524 determines that the vehicle 10 is in a collision-prediction condition. On the other hand, when the shortest distance D2 between the vehicle 10 and the obstacle Ob is equal to or greater than the second distance, the detection unit 524 determines that the vehicle 10 is not in a collision-prediction condition. When the shortest distance D2 between the vehicle 10 and the obstacle Ob is 0, the detection unit 524 determines that the vehicle 10 is in the collided state. The determination method for determining whether the vehicle 10 is in the assistance required state is not limited to the above.

According to the first embodiment, the operator operates the operator input device 3 provided at a place different from the vehicle 10, whereby the vehicle 10 can be caused to travel in the remote manual driving mode in which the vehicle 10 is remotely controlled. In a period in which the control of the remote manual driving mode is performed, the vehicle 10 may be in the assistance required state due to an operation error of the operator. In this case, the information processing device 5 can acquire the detection information and send an automatic control signal to the vehicle 10 that has been in the assistance required state. In this way, when the vehicle 10 is in the assistance required state, the information processing device 5 can cause the vehicle 10 to travel using the automatic control signal without using the manual control signal corresponding to the operation of the operator.

Thus, the information processing device 5 can assist in traveling of the vehicle 10 when the vehicle 10 is in the assistance required state. Specifically, the information processing device 5 can reduce a possibility that the vehicle 10 deviates from the ideal route Ip or collides with an object Ob existing around the vehicle 10 due to an operator error. Further, an operator error may cause the vehicle 10 to deviate from the ideal route Ip and may cause the vehicle 10 to collide with an object Ob existing around the vehicle 10. Also in these cases, the information processing device 5 can assist in traveling of the vehicle 10 in order to correct undesired traveling of the vehicle 10.

Further, according to the first embodiment, when the detection information is acquired, the information processing device 5 can perform the first process of sending the automatic control signal to the vehicle 10 without sending the manual control signal indicating that the vehicle is in the assistance required state. That is, the information processing device 5 can select a control signal to be used by the vehicle 10 in accordance with whether or not the vehicle 10 is in the assistance required state, and can send only the control signal to be used by the vehicle 10 to the vehicle 10.

Further, according to the first embodiment, the information processing device 5 can display a captured image indicating a surrounding state of the vehicle 10 to be controlled on a display screen disposed at a position visible to an operator operating the operator input device 3. Thus, the operator can operate the operator input device 3 while visually recognizing the display screen and checking the surrounding situation of the vehicle 10 to be controlled.

Further, according to the first embodiment, the information processing device 5 can notify the operator that the vehicle 10 is traveling in accordance with the automatic control signal. Thus, the operator can quickly grasp the vehicle 10 traveling in accordance with the automatic control signal.

Further, according to the first embodiment, the information processing device 5 can repeatedly calculate the automatic control signal at predetermined time intervals in a period in which the control of the remote manual driving mode is performed. Thus, when the detection information is acquired, the information processing device 5 can promptly send the automatic control signal to the vehicle 10.

In addition, according to the first embodiment, the information processing device 5 includes a detection unit 524. As a result, the information processing device 5 can determine whether or not the vehicle 10 is in the assistance required state.

Further, according to the first embodiment, the information processing system 1 can cause the vehicle 10 to travel in a factory by remote control. Therefore, the information processing system 1 can move the vehicle 10 in the factory without using a conveyance facility such as a crane or a conveyor. The vehicle 10 may travel by unmanned driving in a place other than the factory.

B. Second Embodiment

Figure 5:
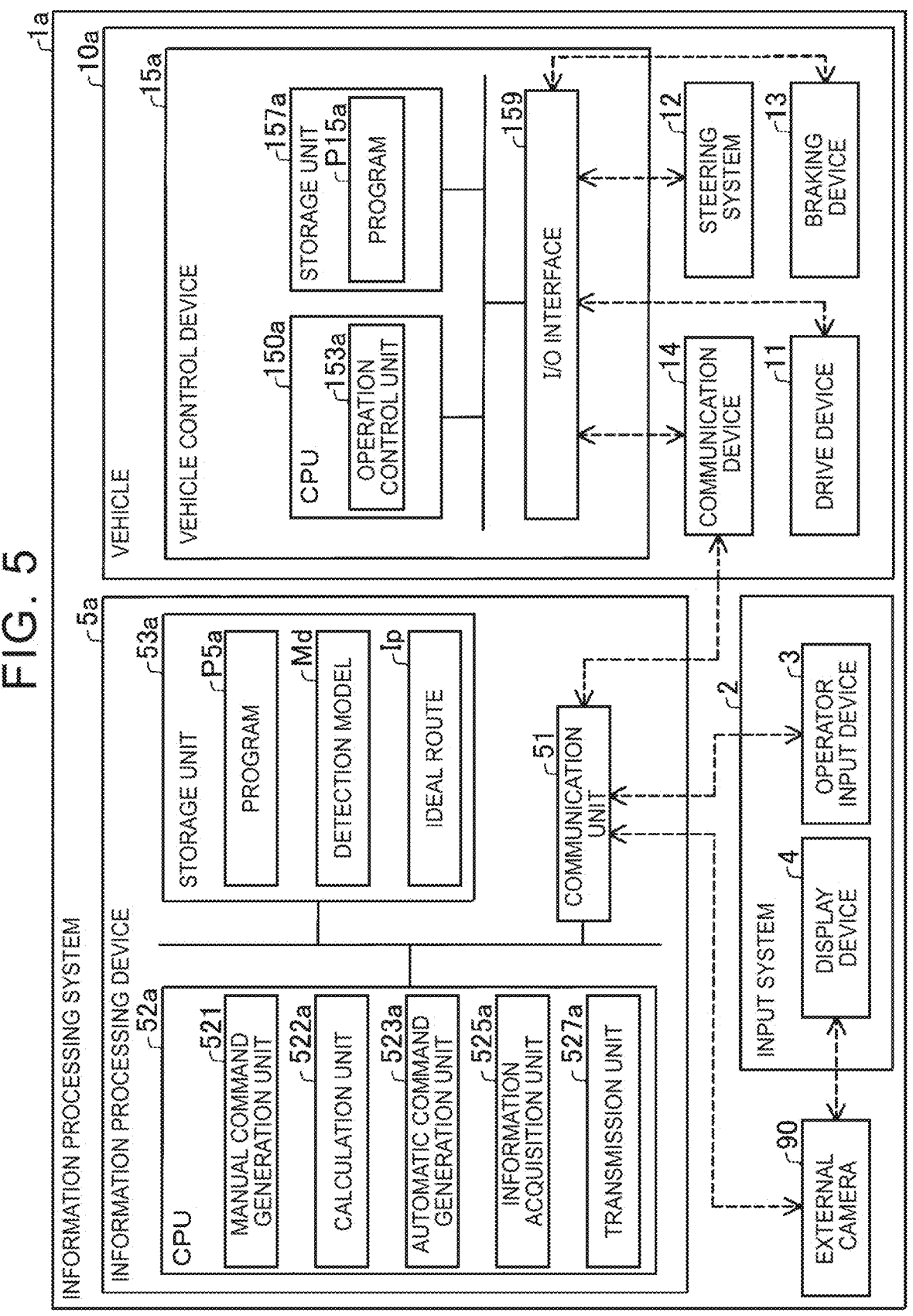
FIG. 5 is a diagram illustrating a configuration of an information processing system according to a second embodiment.

FIG. 5 is a diagram illustrating a configuration of an information processing system 1a according to the second embodiment. The information processing system 1a includes one or more vehicles 10a, an external camera 90, an input system 2, and an information processing device 5a. Also in the present embodiment, the manual control command is a manual control command including the acceleration and the steering angle of the vehicle 10a as parameters. Further, the automatic control command is an automatic control signal including the acceleration and the steering angle of the vehicle 10a as parameters. The same components as those in the first embodiment are denoted by the same reference numerals.

The CPU 52a of the information processing device 5a functions as a manual command generation unit 521, a calculation unit 522a, an automatic command generation unit 523a, an information acquisition unit 525a, and a transmission unit 527a by expanding various program P5a stored in the storage unit 53a. The information acquisition unit 525a acquires detection information generated by a detection unit provided in an external device (for example, the external camera 90) that differs from the information processing device 5a. When the information acquisition unit 525a acquires the detection information, the calculation unit 522a calculates the position of the vehicle 10a using the captured images. When the information acquisition unit 525a acquires the detection information, the automatic command generation unit 523a determines the target position to which the vehicle 10a should be directed next, using the position information of the vehicle 10a and the ideal route Ip. Then, the automatic command generation unit 523a generates an automatic control signal for causing the vehicle 10a to travel toward the determined target position. Further, the automatic command generation unit 523a generates supplementary information. The supplementary information is information for instructing the vehicle 10a to preferentially use the automatic control command over the manual control command. In the present embodiment, when the information acquisition unit 525a acquires the detection information, the transmission unit 527a performs a second process of sending the manual control signal, the automated control signal, and the supplementary information to the vehicle 10a that is in the assistance required state.

The vehicle 10a functions as an operation control unit 153a by expanding various programming P15a stored in the storage unit 157a. When the vehicle 10a receives the manual control command, the automatic control command, and the supplementary information from the information processing device 5a via the communication device 14, the vehicle control device 15a uses the automatic control command in preference to the manual control command. In the present embodiment, when the manual control signal, the automatic control signal, and the supplementary information are received, the operation control unit 153a controls the actuator using the automatic control signal to cause the vehicle 10a to travel at the acceleration and the steering angle represented by the automatic control signal.

Figure 6:
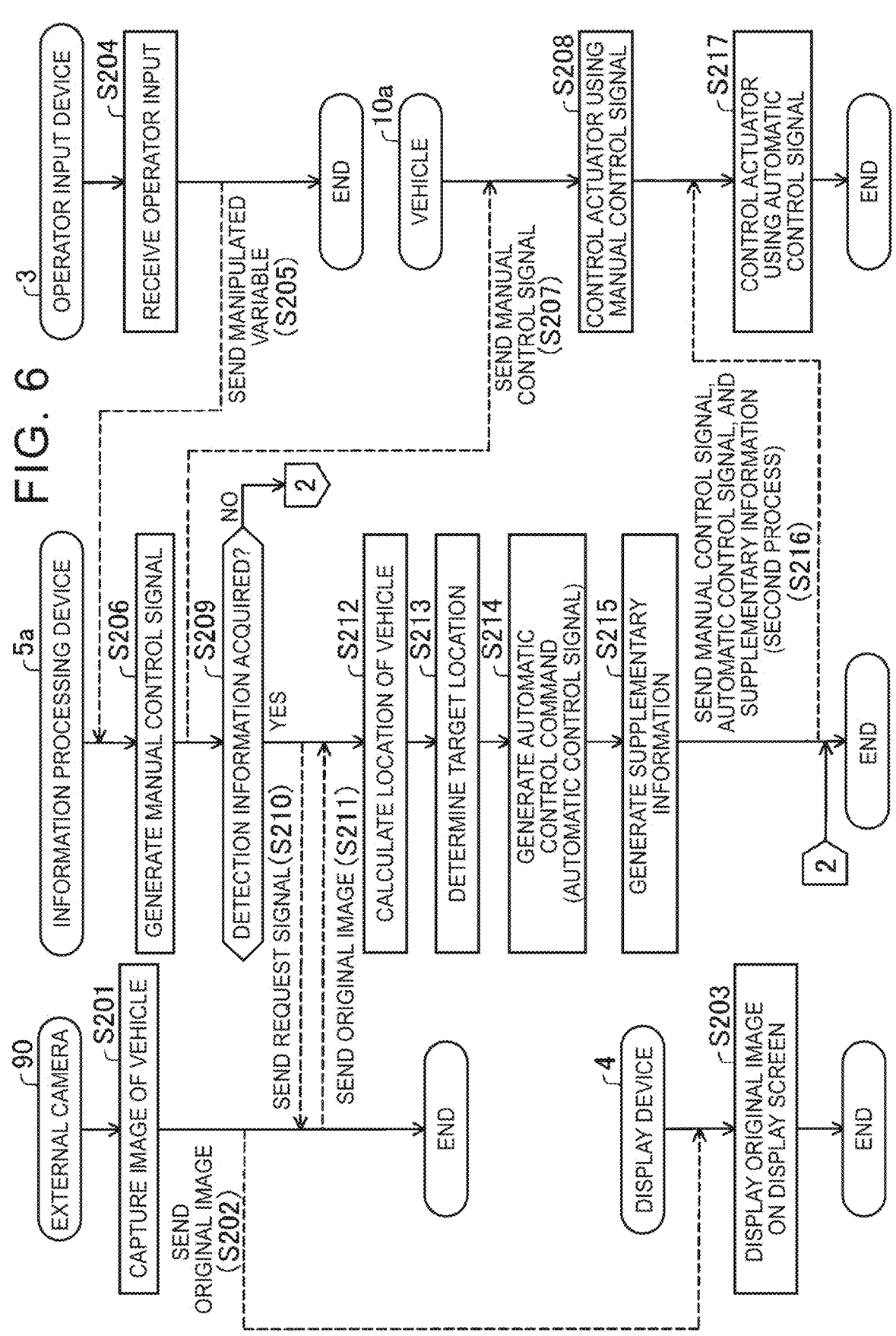
FIG. 6 is a flowchart illustrating a processing flow in the second embodiment.

FIG. 6 is a flowchart illustrating a processing flow in the second embodiment. Each step illustrated in FIG. 6 is repeatedly performed at predetermined time intervals, for example, in a period in which the control of the remote manual driving mode is performed.

In S201, the external camera 90 captures an image of the vehicle 10a to be controlled, thereby acquiring an original image. In S202, the external camera 90 sends the original image to the display device 4. In S203, the display device 4 causes the original image to be displayed on the display screen. In S204, the operator input device 3 receives an input from an operator. In S205, the operator input device 3 sends the operation amounts of the input operation units to the information processing device 5a. In S206, the manual command generation unit 521 of the information processing device 5a generates a manual control signal. The manual control signal indicates an acceleration corresponding to the operation amount of the accelerator pedal and the brake pedal of the operator input device 3 and a steering angle corresponding to the operation amount of the steering wheel of the operator input device 3. In S207, the transmission unit 527 sends a manual control signal to the vehicle 10a to be controlled. In S208, the vehicle 10a is caused to travel at an acceleration and a steering angle represented by the manual control signal by the vehicle control device 15a mounted on the vehicle 10a controlling the actuator using the received manual control signal, by the operation control unit 153a. The information processing device 5a repeatedly receives the manual control signal and controls the actuator at a predetermined cycle.

When the detection information is acquired (S209: Yes), the information acquisition unit 525 of the information processing device 5a sends a request signal for acquiring the original image from the external camera 90 to the external camera 90 in S210. In S211, the external camera 90 sends the original image to the information processing device 5a. In S212, the calculation unit 522a calculates the position of the vehicle 10a to be controlled by using the captured images. In S213, the automatic command generation unit 523a determines a target position to which the vehicle 10a should be directed next, using the position information of the vehicle 10a and the ideal route Ip. In S214, the automatic command generation unit 523a generates an automatic control signal for causing the vehicle 10a to travel toward the determined target position. In S215, the automatic command generation unit 523a generates supplementary information. In S216, the transmission unit 527a sends the manual control signal, the automated control signal, and the supplementary information to the vehicle 10a to be controlled.

The operation control unit 153 of the vehicle control device 15a mounted on the vehicle 10a that has received the manual control signal, the automatic control signal, and the supplementary information controls the actuator using the automatic control signal in S217. Accordingly, the operation control unit 153 causes the vehicle 10a to travel at the acceleration/steering angle indicated by the automatic control signal. The vehicle control device 15a repeatedly receives the control signal and controls the actuator at a predetermined cycle.

According to the second embodiment, when the detection information is acquired, the information processing device 5a can send the manual control signal, the automated control signal, and the supplementary information to the vehicle 10a that is in the assistance required state. In this way, the information processing device 5a can instruct the vehicle 10a to preferentially use the automated control signal over the manual control signal. Accordingly, when the manual control signal, the automatic control finger signal, and the supplementary information are received, the vehicle 10a can preferentially use the automatic control signal over the manual control finger signal. In other words, the vehicle 10a can select a control signal to be used among the manual control signal and the automated control signal by using the supplementary information.

Further, according to the second embodiment, the information processing device 5a can calculate the position of the vehicle 10a and generate the automatic control signal when the detection information is acquired. In this way, it is possible to generate the manual control signal without calculating the position of the vehicle 10a or generating the automatic control signal during a time period in which the automatic control signal is not required to be sent to the vehicle 10a. As a result, it is possible to reduce the process burden on the information processing device 5a.

C. Third Embodiment

Figure 7:
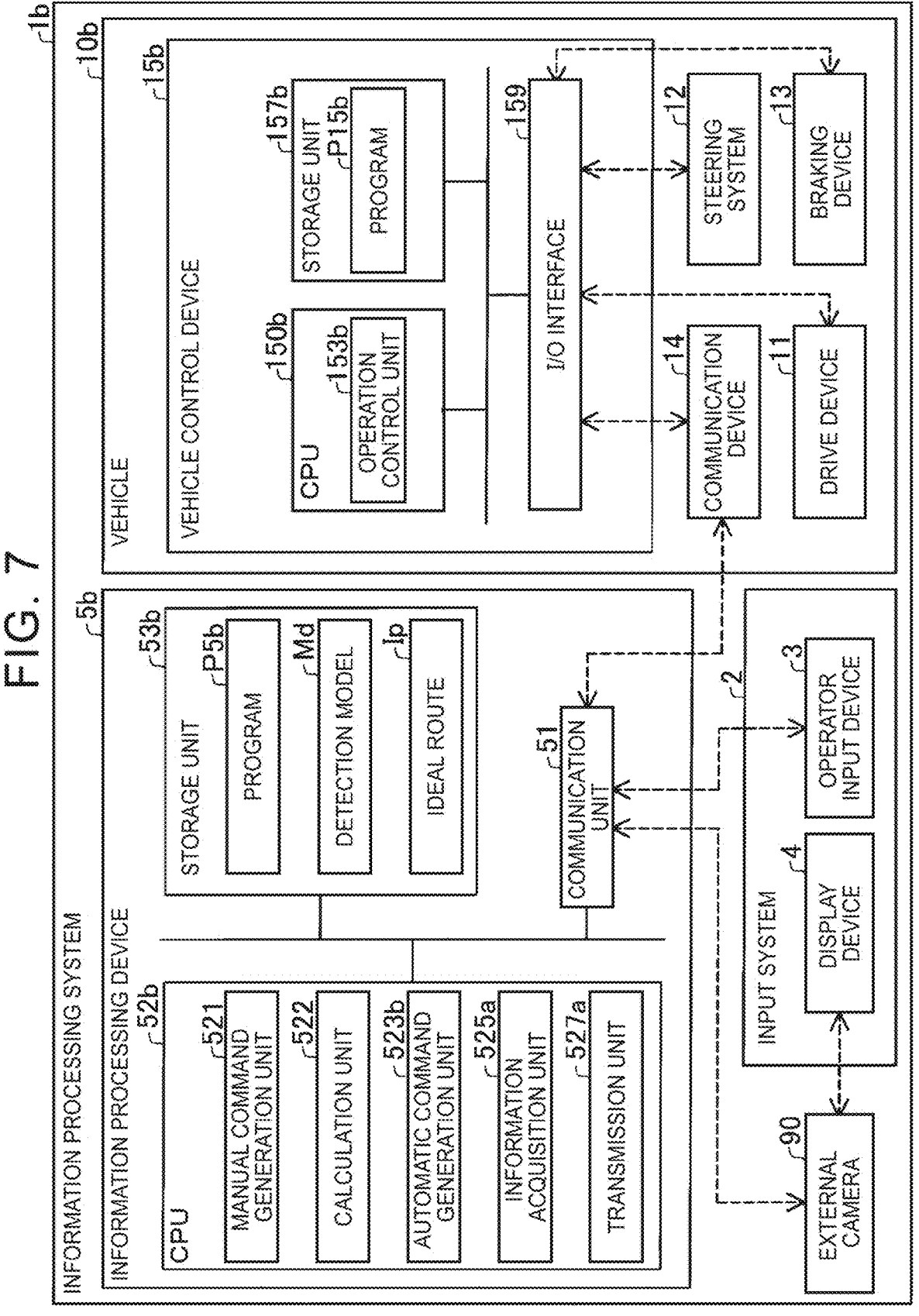
FIG. 7 is a diagram illustrating a configuration of an information processing system according to a third embodiment.

FIG. 7 is a diagram illustrating a configuration of an information processing system 1b according to a third embodiment. The information processing system 1b includes one or more vehicles 10b, an external camera 90, an input system 2, and an information processing device 5b. Also in the present embodiment, the manual control command is a manual control command including the acceleration and the steering angle of the vehicle 10b as parameters. On the other hand, in the present embodiment, the automatic control command includes one of an automatic control signal including the acceleration and the steering angle of the vehicle 10b as parameters and a stopping signal for stopping the vehicle 10b. The same components as those of the first embodiment and the second embodiment are denoted by the same reference numerals.

CPU 52b of the information processing device 5b functions as a manual command generation unit 521, a calculation unit 522, an automatic command generation unit 523b, an information acquisition unit 525a, and a transmission unit 527b by expanding various program P5b stored in the storage unit 53b.

When the information acquisition unit 525a acquires the detection information and the predetermined starting condition is satisfied, the automatic command generation unit 523b generates an automatic control signal. When the information acquisition unit 525a acquires the detection information and the predetermined starting condition is not satisfied, the automatic command generation unit 523b generates a stop signal. The start condition is a condition serving as a trigger for starting generation of an automatic control signal. The start condition includes, for example, at least one of a time condition, an accuracy condition, and a transition condition. The time condition is a condition related to a timing at which the generation of the automatic control signal is started. The case where the time condition is satisfied is, for example, a case where a predetermined time has elapsed since the time when the control of the remote manual driving mode is started. The accuracy condition is a condition related to the accuracy of the position information of the vehicle 10b used to generate the automatic control signal. The case where the accuracy criterion is satisfied is, for example, a case where the accuracy of the position information of the vehicle 10b calculated by the calculation unit 522 is equal to or higher than a predetermined accuracy. The transition condition is a condition for enabling smooth transition from the remote control according to the manual control signal to the control according to the automatic control signal. The case where the transition condition is satisfied is a case where there is a low possibility that 10b will cause a running failure when the transition is made from the remote control corresponding to the manual control signal to the remote control corresponding to the automatic control signal. Specifically, the case where the transitional condition is satisfied is, for example, a case where, when it is assumed that the vehicle 10b travels along the ideal route Ip, the vehicle 10b is scheduled to travel over a predetermined distance or more and less than the predetermined steering angle. That is to say, the transition condition is satisfied when, for example, 10b of vehicles is scheduled to travel on a generally straight route without traveling on a curved route over a predetermined range.

When the information acquisition unit 525a acquires the detection information, the transmission unit 527b sends a manual control signal and an automatic control command to the vehicle 10a that has been in the assistance required state.

CPU 150b of the vehicle-control device 15b functions as an operation control unit 153b by expanding various program P15b stored in the storage unit 157b. When the vehicle 10b receives both the manual control command and the automatic control command from the information processing device 5b via the communication device 14, the vehicle control device 15b uses the automatic control command in preference to the manual control command. In the present embodiment, when both the manual control signal and the automatic control signal are received, the operation control unit 153b controls the actuator by using the automatic control signal to drive the vehicle 10b at the acceleration and the steering angle represented by the automatic control signal.

Figure 8:
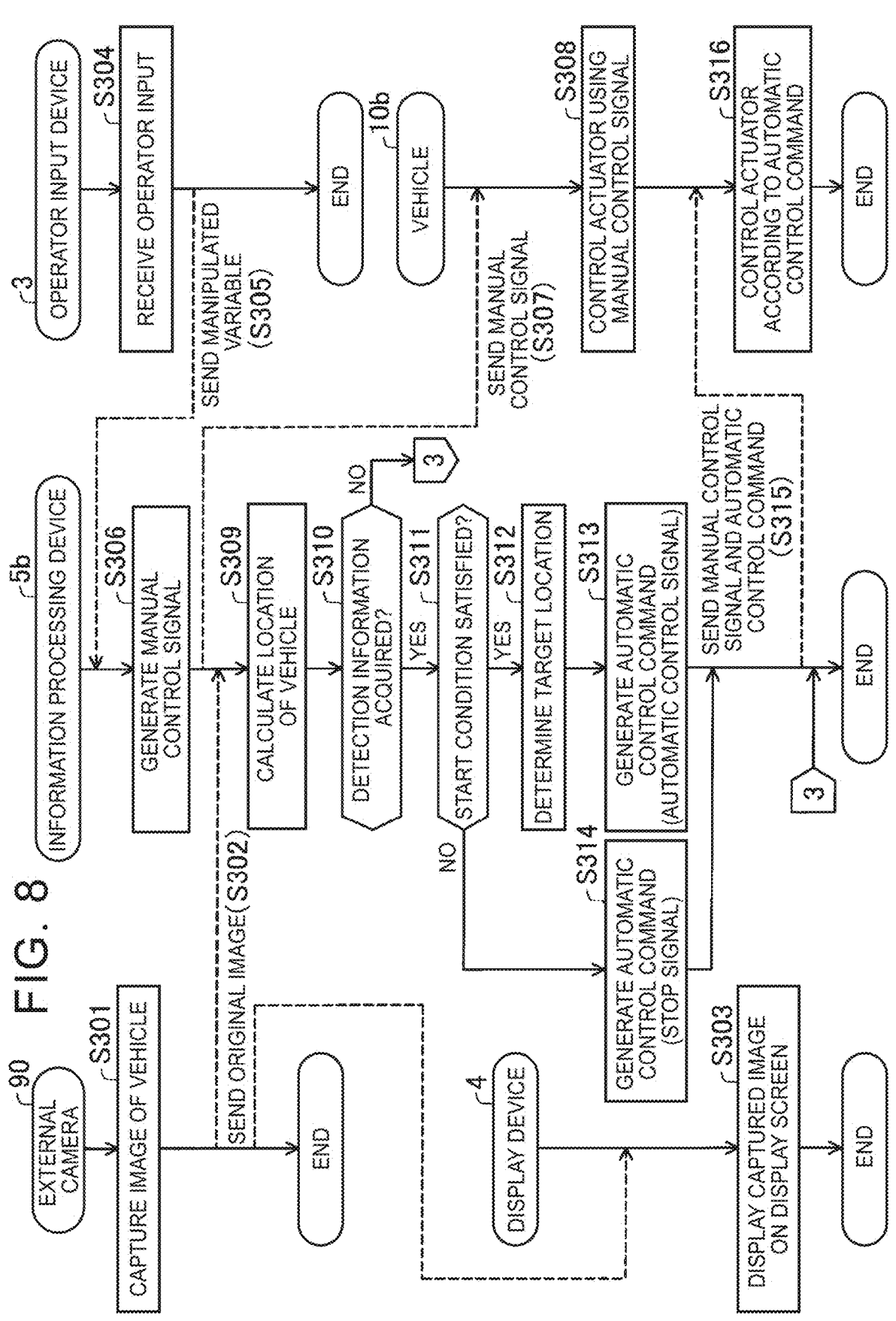
FIG. 8 is a flowchart illustrating a processing flow in the third embodiment.

FIG. 8 is a flowchart illustrating a processing flow in the third embodiment. Each step illustrated in FIG. 8 is repeatedly performed at predetermined time intervals, for example, in a period in which the control of the remote manual driving mode is performed. Note that each step from S301 to S308 is the same as each step from S201 to S208 shown in FIG. 6.

In S309, the calculation unit 522 calculates the position of the vehicle 10b to be controlled by using the captured images. When the information acquisition unit 525 acquires the detection information (S310: Yes), and when the starting condition is satisfied (S311: Yes), the automatic command generation unit 523b performs S312. In S312, the automatic command generation unit 523b determines a target position to which the vehicle 10b should be directed next, using the position information of the vehicle 10b and the ideal route Ip. In S313, the automatic command generation unit 523b generates an automatic control command including an automatic control signal for causing the vehicle 10b to travel toward the determined target position. On the other hand, in a case where the information acquisition unit 525 acquires the detection information (S310: Yes), in a case where the starting condition is not satisfied (S311: No), the automatic command generation unit 523b performs S314. In S314, the automatic command generation unit 523b generates an automatic control command including a stopping signal in place of the automatic control signal. In S315, the transmission unit 527b sends a manual control signal and an automatic control command including one of the automatic control signal and the stopping signal to the vehicle 10b to be controlled.

The operation control unit 153b of the vehicle control device 15b of the vehicle 10b that has received both the manual control signal and the automatic control signal controls the actuator using the automatic control signal in S316. Accordingly, the operation control unit 153b causes the vehicle 10b to travel at the acceleration and the steering angle indicated by the automatic control signal. The vehicle control device 15a repeatedly receives the control signal and controls the actuator at a predetermined cycle. On the other hand, when both the manual control signal and the stop signal are received, the operation control unit 153b controls the actuator using the stop signal in S316. As a result, the operation control unit 153b stops the vehicle 10b.

According to the third embodiment, when the detection information is acquired, the information processing device 5b can send a manual control signal and an automatic control command that is one of the automatic control signal and the stop signal to the vehicle 10b that has been in the assistance required state. When receiving both the manual control signal and the automatic control command, the vehicle control device 15b of the vehicle 10b can preferentially use the control signal related to the automatic control command rather than the manual control signal. In other words, the vehicle 10b can select a control signal to be used.

In addition, according to the third embodiment, the information processing device 5b may be configured to generate an automatic control signal when the detection information is acquired and the start condition is satisfied.

In addition, according to the third embodiment, the start condition may include a time condition. In this case, the information processing device 5*b* can generate the manual control signal without generating the automatic control signal during a period from the time when the control of the remote manual driving mode is started to the time when the predetermined time elapses. Accordingly, it is possible to reduce the workload of the information processing device 5*b* from the time when the remote manual driving mode is started to the time when the predetermined time elapses. Further, the information processing device 5*b* may acquire the detection information after a predetermined period of time has elapsed from the time when the control of the remote manual driving mode is started. In this case, the information processing device 5*b* can promptly send either the automation control signal or the stopping signal to the vehicle 10*b* according to whether or not the starting condition is satisfied.

Further, according to the third embodiment, when the starting condition includes the accuracy condition, the information processing device 5*b* can generate the automatic control signal using the calculation result of the position of the vehicle 10*b* and the calculation result having the accuracy equal to or higher than the predetermined accuracy. Accordingly, the information processing device 5*b* can reduce an error between the ideal route Ip and the actual travel route when the vehicle 10*b* is caused to travel in accordance with the automatic control signal.

Further, according to the third embodiment, when the start condition includes the transition condition, the information processing device 5*b* can generate and send the automatic control signal when the transition condition is satisfied. Accordingly, it is possible to reduce the possibility that the vehicle 10*b* will cause a traveling failure when the vehicle 10*b* transitions from the remote control according to the manual control signal to the remote control according to the automated control signal.

D. Fourth Embodiment

Figure 9:
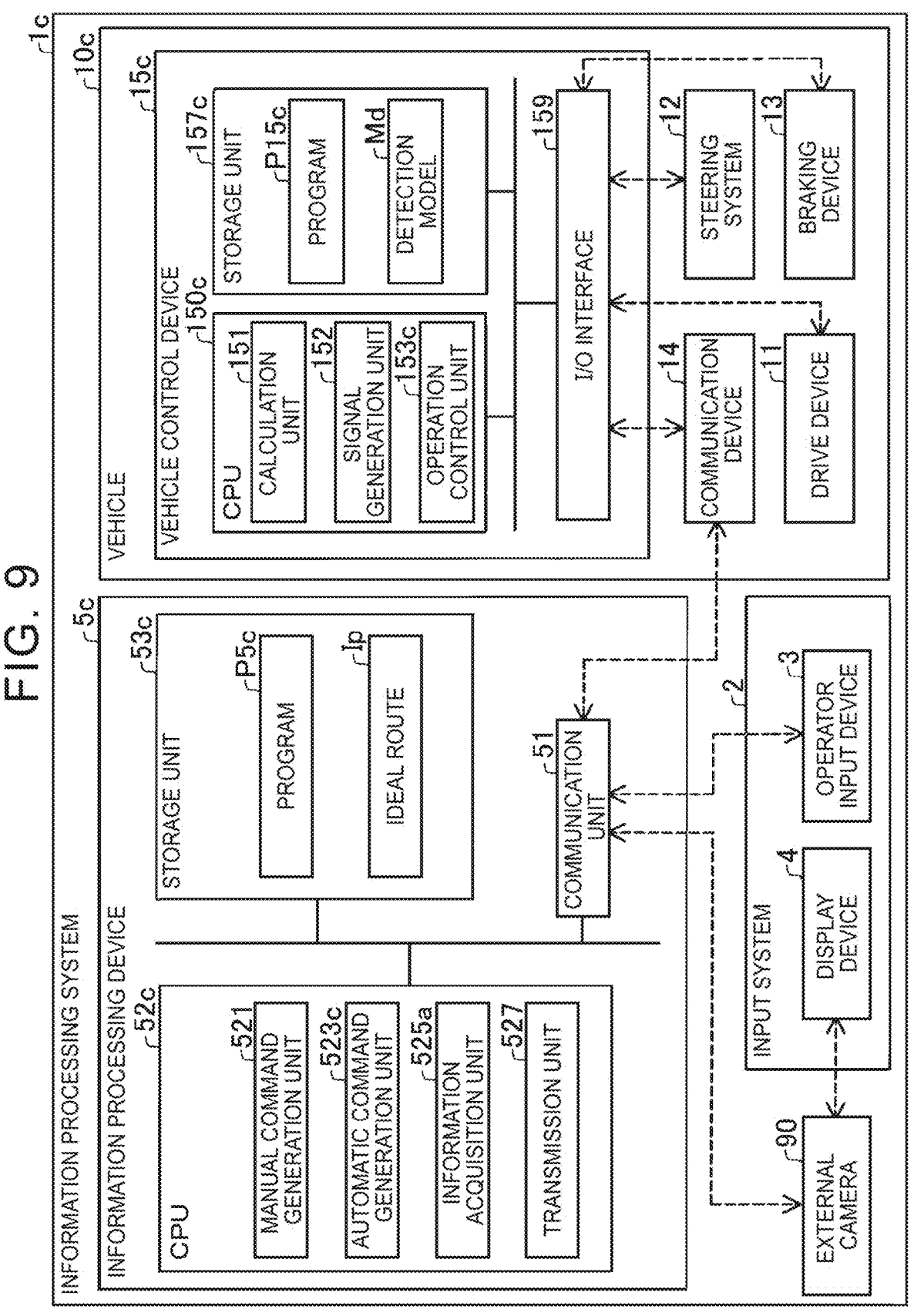
FIG. 9 is a diagram illustrating a configuration of an information processing system according to a fourth embodiment.

FIG. 9 is a diagram illustrating a configuration of an information processing system 1*c* according to a fourth embodiment. The information processing system 1*c* includes one or more vehicle 10*c* equipped with a vehicle control device 15*c* having some functions of the information processing device 5, an external camera 90, an input system 2, and an information processing device 5*c*. Also in the present embodiment, the manual control command is a manual control command including the acceleration and the steering angle of the vehicle 10*c* as parameters. In contrast, in the present embodiment, the automatic control command is a route control command indicating a route on which the vehicle 10*c* should travel. The same components as those of the first to third embodiments are denoted by the same reference numerals.

CPU 52*c* of the information processing device 5*c* functions as a manual command generation unit 521, an automatic command generation unit 523*c*, an information acquisition unit 525*a*, and a transmission unit 527 by expanding various program P5*c* stored in the storage unit 53*c*. The automatic command generation unit 523*c* generates a route control command using the ideal route Ip stored in advance in the storage unit 53*c*.

CPU 150*c* of the vehicle-control device 15*c* functions as a calculation unit 151, a signal generation unit 152, and an operation control unit 153*c* by expanding various program P15*c* stored in the storage unit 157*c*.

When the vehicle 10*c* receives a route control command as an automatic control command from the information processing device 5*c* via the communication device 14, the calculation unit 151 calculates the position of the vehicle 10*c* using the captured images. The signal generation unit 152 determines a target position to which the vehicle 10*c* should be directed next by using the position information of the vehicle 10*c* and the route control command. Then, the signal generation unit 152 generates an automatic control signal for traveling toward the determined target position. The operation control unit 153*c* controls the actuator by using the generated automatic control signal to cause the vehicle 10*c* to travel at the acceleration and the steering angle represented by the automatic control signal.

Figure 10:
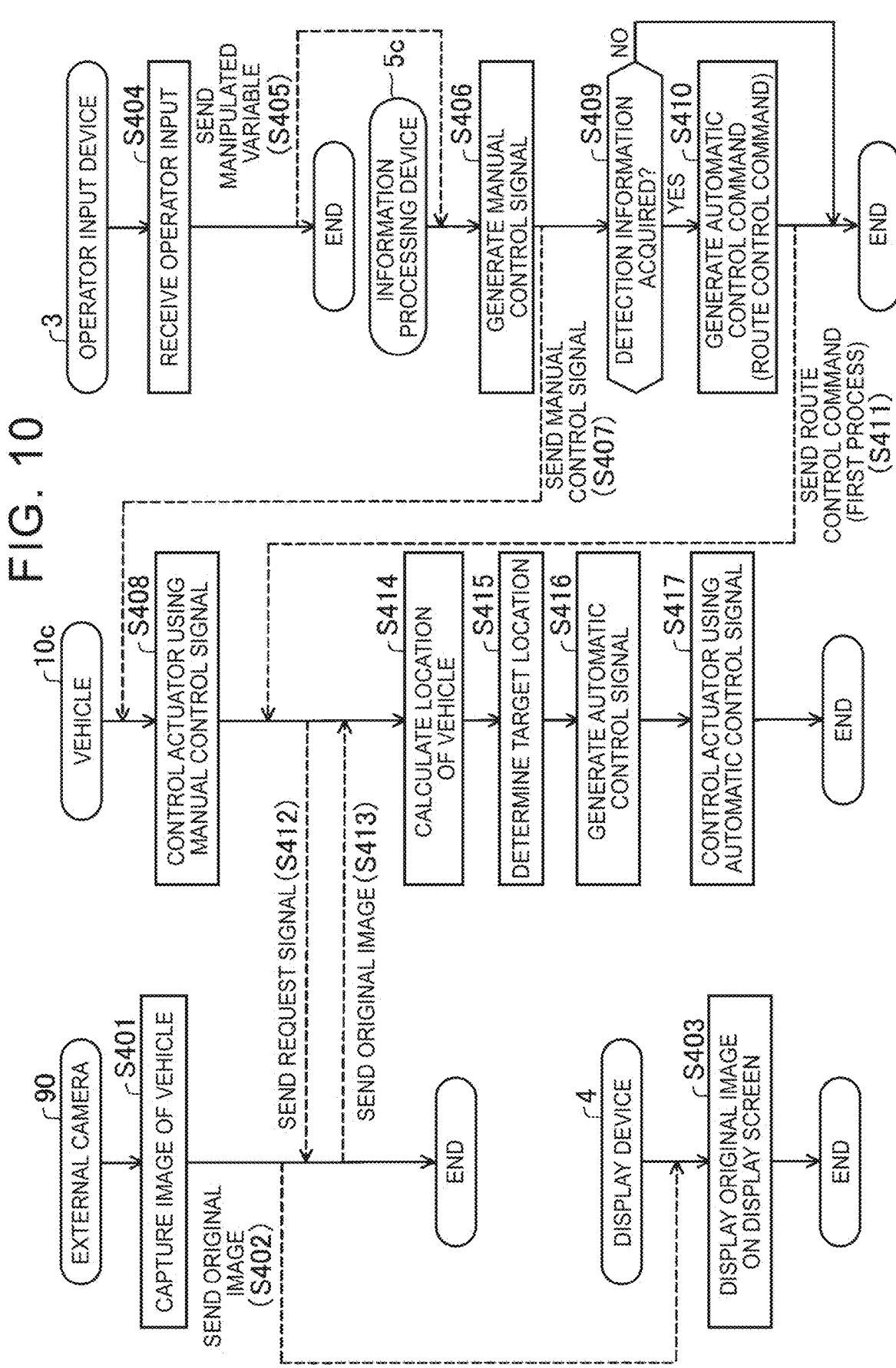
FIG. 10 is a flowchart illustrating a processing flow in the fourth embodiment.

FIG. 10 is a flowchart illustrating a processing flow in the fourth embodiment. Each step illustrated in FIG. 10 is repeatedly performed at predetermined time intervals, for example, in a period in which the control of the remote manual driving mode is performed. The steps from S401 to S408 are the same as the steps from S201 to S208 shown in FIG. 6.

When the information acquisition unit 525*a* of the information processing device 5*c* acquires the detection information (S409: Yes), in S410, the automatic command generation unit 523*c* generates a route control command as an automatic control command. In S411, the transmission unit 527 sends the route control command to the vehicle 10*c* to be controlled. When the vehicle control device 15*c* of the vehicle 10*c* receives the route control command, the calculation unit 151 of the vehicle control device 15*c* mounted on the vehicle 10*c* sends a request signal for acquiring the original image from the external camera 90 to the external camera 90 in S412. In S413, the external camera 90 sends the original image to the vehicle 10*c*. In S414, the calculation unit 151 of the vehicle control device 15*c* mounted on the vehicle 10*c* calculates the location of the vehicle 10*c* to be controlled by using the captured images. In S415, the signal generation unit 152 determines a target position to which the vehicle 10*c* should be directed next by using the position information of the vehicle 10*c* and the route control command. In S416, the signal generation unit 152 generates an automated control signal for traveling toward the determined target position. In S417, the operation control unit 153*c* controls the actuator by using the generated automatic control signal to cause the vehicle 10*c* to travel at the acceleration and the steering angle represented by the automatic control signal.

According to the fourth embodiment, when the detection information is acquired, the information processing device 5*c* can send the route control command as the automatic control command to the vehicle 10*c* that is in the assistance required state. In addition, the external camera 90 can send, to the vehicle 10*c*, an original image obtained by capturing the vehicle 10*c* that is in the assistance required state in response to a request from the vehicle 10*c*. In this way, the vehicle control device 15*c* can calculate the position of the vehicle 10*c* and generate the automatic control signal using the position information of the vehicle 10*c* and the route control command. In other words, the vehicle 10*c* can eliminate the deviation prediction state, the deviation state, the collision prediction state, and the collision state by automatically traveling using the automatic control signal generated by the vehicle 10*c* itself without using the manual control command when the vehicle is in the assistance required state.

Further, according to the fourth embodiment, after sending the automatic control command, the information processing system 1c can cause the vehicle 10c to travel by autonomous control without being remotely controlled by the information processing device 5c.

Note that the automatic control command is not limited to the automatic control signal and the route control command. The automatic control command is, for example, one of an automatic control signal, a route control command, and a destination control command. The destination control command is a control command indicating a destination of the vehicle 10. The destination control command may include a target arrival time to the destination.

E. Other Embodiments

E-1. Other Embodiment 1

The calculation unit 151, 522, 522a may calculate the position and the direction of the vehicle 10, 10a to 10c by using sensor data acquired by a sensor of a type different from that of the external camera 90. Light Detection And Ranging (LiDAR) as an external sensor is hereinafter also referred to as an external lidar. The calculation unit 151, 522, 522a may calculate the position and the direction of the vehicle 10, 10a to 10c using, for example, measured point cloud data obtained by the external rider and representing the appearance-shape of the vehicle 10, 10a to 10c three-dimensionally. Here, the calculation unit 151, 522, 522a calculates the position and the direction of the vehicle 10, 10a to 10c by, for example, matching using the measured point cloud data and the reference-point cloud data. The reference point cloud data is reference data used as a template in matching with the measurement point cloud data. The reference-point cloud data is, for example, virtual three-dimensional point cloud data generated based on three-dimensional CAD data representing the appearance-shape of the vehicle 10, 10a to 10c. For example, one of Iterative Closest Point (ICP) and Normal Distributions Transform (NDT) is used as the algorithm for matching by the calculation unit 151, 522, 522a. The calculation unit 151, 522, 522a may calculate the position and the direction of the vehicle 10, 10a to 10c using the measured point cloud data. The measured point cloud data is acquired by detecting the vehicle 10, 10a to 10c to be calculated by an in-vehicle rider mounted on another vehicle 10, 10a to 10c that differs from the vehicle 10, 10a to 10c to be calculated.

E-2. Other Embodiment 2

The detection unit 524 may detect that the vehicle 10, 10a to 10c is in the assistance required state by analyzing the sensor data acquired by the sensor without using the position of the vehicle 10, 10a to 10c. In this case, the sensor information may be information acquired by an external sensor or information acquired by an in-vehicle sensor. When the sensor information is a captured image acquired by the external camera 90, the detection unit 524 detects the vehicle 10, 10a to 10c and the reference object in the captured image, for example, and calculates a distance between the vehicle 10, 10a to 10c and the reference object. Then, the detection unit 524 determines whether the vehicle 10, 10a to 10c is in at least one of a deviation forecast state and a deviation state in accordance with the distance between the vehicle 10, 10a to 10c and the reference object. The reference object is, for example, at least one of a dividing line attached to a track Ro such as a lane outer side line, a lane border line, or a centerline, and a road-side object such as a guardrail provided on both end portions in the widthwise direction of the track Ro. In addition, for example, the detection unit 524 detects the vehicle 10, 10a to 10c and the obstacle Ob in the captured images, and calculates the distance between the vehicle 10, 10a to 10c and the obstacle Ob. Then, the detection unit 524 determines whether the vehicle 10, 10a to 10c is in at least one of a collision forecast state and a collision state in accordance with the distance between the vehicle 10, 10a to 10c and the obstacle Ob. With this configuration, the detection unit 524 can detect that the vehicle 10, 10a to 10c is in the assistance required state without using the position of the vehicle 10, 10a to 10c.

E-3. Other Embodiment 3

The detection unit 524 may detect that the vehicle 10, 10a to 10c is in the assistance required state in accordance with the travel condition of the vehicle 10, 10a to 10c. For example, the detection unit 524 acquires the traveling velocity, the acceleration, and the steering angle of the vehicle 10, 10a to 10c from the detection performed by the in-vehicle sensor mounted on the vehicle 10, 10a to 10c. Further, the detection unit 524 may acquire the traveling speed, the acceleration, the steering angle, and the like of the vehicle 10, 10a to 10c on the basis of the acceleration, the steering angle, the speed, and the like represented by the manual control command and the automatic control command, for example. With such a configuration, the detection unit 524 can detect that the vehicle 10, 10a to 10c is in the assistance required state according to the traveling condition of the vehicle 10, 10a to 10c.

E-4. Other Embodiment 4

The detection unit 524 may detect that 10, 10a to 10c of vehicles is in the assistance required state by using sensor data acquired by a different type of sensor from the camera and the lidar. Specifically, for example, the detection unit 524 may detect that the vehicle 10, 10a to 10c is in the assistance required state by using the sensor data acquired by the in-vehicle radar mounted on the vehicle 10, 10a to 10c to be detected. In addition, the detection unit 524 may detect that 10, 10a to 10c of vehicles is in the assistance required state using, for example, a Radio Detection and Ranging (Radar) as an external sensor (hereinafter referred to as an external radar). Furthermore, the detection unit 524 may detect that 10, 10a to 10c of vehicles is in the assistance required state, for example, by using sensor data acquired by a laser scanner installed on the track Ro. In order to determine whether the vehicle 10, 10a to 10c is in at least one of a collision forecast state and a collision state, the laser scanner is provided, for example, at a position capable of detecting within a predetermined range from the obstacle Ob. Furthermore, the detection unit 524 may detect that 10, 10a to 10c of vehicles is in the assistance required state by using the sensor data acquired by the impact sensor that detects the impact. In this case, the impact sensor may be mounted on the vehicle 10, 10a to 10c to be detected, or may be mounted on the obstacle Ob. According to such a configuration, the detection unit 524 can detect that 10, 10a to 10c of vehicles is in the assistance required state by using sensor data acquired by a sensor of a type different from that of the camera and the lidar.

E-5. Other Embodiment 5

The manual command generation unit 521, the detection unit 524, and the information acquisition unit 525, 525a may be one function of the vehicle control device 15, 15a to 15c mounted on the vehicle 10, 10a to 10c. According to such a configuration, the vehicle control device 15, 15a to 15c can generate a manual control signal by acquiring an operation amount of the operator of the operator input device 3, and can travel in the remote manual driving mode. Further, the vehicle control device 15, 15a to 15c can detect that the vehicle 10, 10a to 10c is in the assistance required state. Furthermore, the vehicle control device 15, 15a to 15c can recognize that the vehicle 10, 10a to 10c is in the assistance required state by acquiring the detection information. Furthermore, the vehicle control device 15, 15a to 15c generates an automatic control signal when the detection information is acquired, and controls the actuator by using the automatic control signal, so that the vehicle can automatically travel without using the manual control command. That is, the vehicle 10, 10a to 10c can travel without receiving a control command from the information processing device 5, 5a to 5c.

E-6. Other Embodiment 6

The manual command generation unit 521 may be a manual control signal by uniformly multiplying an operation amount corresponding to each element which is an operation amount of each input operation unit of the operator input device 3 and which defines the traveling motion of the vehicle 10, 10a to 10c by a predetermined constant. Specifically, the manual control signal may include the acceleration and steering angle of the vehicle 10, 10a to 10c as parameters. In this case, the manual command generation unit 521 uniformly multiplies the operation amounts of the accelerator pedal, the brake pedal, and the steering wheel of the operator input device 3 by predetermined constants. Then, the manual command generation unit 521 generates a manual control signal so that the acceleration of the vehicle 10, 10a to 10c becomes a value obtained by multiplying the operating amounts of the accelerator pedal and the brake pedal of the operator input device 3 by a constant. In addition, the manual command generation unit 521 generates a manual control signal such that the steering angle of the vehicle 10, 10a to 10c is a value obtained by multiplying the manipulated variable of the steering wheel of the operator input device 3 by a constant. The upper limit value and the lower limit value of the output value of the operator input device 3 may differ from the upper limit value and the lower limit value of the output value of the actuator of the vehicle 10, 10a to 10c. According to the above-described configuration, it is possible to generate a manual control signal corresponding to an output-range of an actuator of a vehicle 10, 10a to 10c that is a receiver.

E-7. Other Embodiment 7

The manual command generation unit 521 may set an upper limit for each element that defines the traveling motion of the vehicle 10, 10a to 10c with respect to the manipulated variable. The operation amount is an operation amount of each input operation unit of the operator input device 3, and is an operation amount corresponding to each element that defines the traveling motion of the vehicle 10, 10a to 10c. For example, when the manual control signal includes the acceleration and the steering angle of the vehicle 10, 10a to 10c as parameters, the manual command generation unit 521 performs the following process. In this case, the manual command generation unit 521 generates a manual control signal so that the acceleration of the vehicle

10, 10a to 10c becomes the first upper limit value when the operation amount of the accelerator pedal of the operator input device 3 is equal to or greater than the first upper limit value. Further, when the manipulated variable of the steering wheel of the operator input device 3 is equal to or greater than the second upper limit value, the manual command generation unit 521 generates a manual control signal so that the steering angle of the vehicle 10, 10a to 10c becomes the second upper limit value. With such a configuration, by providing the upper limit for each element that defines the traveling motion of the vehicle 10, 10a to 10c, it is possible to avoid a sudden change in the traveling motion of the vehicle 10, 10a to 10c. Examples of a sudden change in the traveling motion of the vehicle 10, 10a to 10c include a sudden acceleration or a sudden turning of the vehicle 10, 10a to 10c.

E-8. Other Embodiment 8

In the first to third embodiments, the information processing device 5, 5a, 5b performs a process from acquiring position information of the vehicle 10, 10a, 10b to generating the automatic control signal. On the other hand, the vehicle 10, 10a, 10b may execute at least a part of the process from acquiring the position information of the vehicle 10, 10a, 10b to generating the automated control signal. For example, the following forms (1) to (3) may be used.

(1) The information processing device 5, 5a, 5b may acquire position data of the vehicle 10, 10a, 10b. The information processing device 5, 5a, 5b may determine a target position to which the vehicle 10, 10a, 10b is to be directed next. The information processing device 5, 5a, 5b may generate a route from the current position to the target position of the vehicle 10, 10a, 10b represented by the acquired position information. The information processing device 5, 5a, 5b may generate a route to a target position between the current location and the destination, or may generate a route to the destination. The information processing device 5, 5a, 5b may send the generated route to the vehicle 10, 10a, 10b. The vehicle 10, 10a, 10b may generate an automatic control signal so that the vehicle 10, 10a, 10b travels on a route received from the information processing device 5, 5a, 5b, and control the actuator using the generated automatic control signal.

(2) The information processing device 5, 5a, 5b may acquire the position information of the vehicle 10, 10a, 10b and send the acquired position information to the vehicle 10, 10a, 10b. The vehicle 10, 10a, 10b may determine a target position at which the vehicle 10, 10a, 10b is to be directed next. The vehicle 10, 10a, 10b may generate a route from the current position of the vehicle 10, 10a, 10b to the target position, which is represented by the received position data. The vehicle 10, 10a, 10b may generate an automatic control signal so that the vehicle 10, 10a, 10b travels on the generated route, and control the actuator using the generated automatic control signal.

(3) In the above forms (1), (2), an internal sensor may be mounted on the vehicle 10, 10a, 10b, and a detection result outputted from the internal sensor may be used for at least one of generation of a route and generation of an automated control signal. The internal sensor may include, for example, an in-vehicle camera, an in-vehicle lidar, a millimeter wave radar, an ultrasonic sensor, a GPS sensor, an accelerometer sensor, a gyroscope sensor, and the like. For example, in the form (1), the information processing device 5, 5a, 5b may acquire the detection result of the internal sensor and reflect the detection result of the internal sensor in the path when generating the path. In the form (1), the vehicle 10, 10*a*, 10*b* may acquire the detection result of the internal sensor and reflect the detection result of the internal sensor in the automatic control signal when generating the automatic control signal. In the form (2), the vehicle 10, 10*a*, 10*b* may acquire the detection result of the internal sensor and reflect the detection result of the internal sensor in the path when generating the path. In the form (2), the vehicle 10, 10*a*, 10*b* may acquire the detection result of the internal sensor and reflect the detection result of the internal sensor in the automatic control signal when generating the automatic control signal.

(4) In the fourth embodiment, an internal sensor may be mounted on the vehicle 10*c*, and a detection result outputted from the internal sensor may be used for at least one of generation of a route and generation of an automated control signal. For example, the vehicle 10*c* may acquire the detection result of the internal sensor and reflect the detection result of the internal sensor in the route when generating the route. The vehicle 10*c* may acquire the detection result of the internal sensor and reflect the detection result of the internal sensor in the automatic control signal when generating the automatic control signal.

(5) In the fourth embodiment, the vehicle 10*c* acquires the position information of the vehicle 10*c* using the detection result of the external sensor. On the other hand, an inner sensor may be mounted on the vehicle 10*c*. The vehicle 10*c* may acquire the position information by using the detection result of the internal sensor. The vehicle 10*c* may determine a target position to which the vehicle 10*c* should be directed next, and generate a route from the current position of the vehicle 10*c* represented in the acquired position data to the target position. The vehicle 10*c* may generate an automatic control signal for traveling on the generated route, and control the actuator using the generated automatic control signal. The vehicle 10*c* can then travel without using any of the findings of the external sensors. The vehicle 10*c* may acquire the target arrival time and the traffic jam information from the outside of the vehicle 10*c* and reflect the target arrival time and the traffic jam information on at least one of the route and the automated control signal. In addition, all the functional configurations of the information processing system 1, 1*a* to 1*c* may be provided in the vehicle 10, 10*a* to 10*c*. In other words, the process implemented by the information processing system 1, 1*a* to 1*c*, such as acquiring the detection information and generating the control command, may be implemented by the vehicle 10, 10*a* to 10*c* alone.

E-9. Other Embodiment 9

In the above embodiments, the vehicle 10, 10*a* to 10*c* may have a configuration that can be moved by unmanned driving, and may be, for example, in the form of a platform that includes the configuration described below. Specifically, the vehicle 10, 10*a* to 10*c* may include at least the vehicle control device 15, 15*a* to 15*c*, the drive device 11, the steering device 12, and the braking device 13. This is because the vehicle 10, 10*a* to 10*c* performs three functions of "running", "turning", and "stopping" by unmanned driving. When the vehicle 10, 10*a* to 10*c* acquires information from the outside for unmanned driving, the vehicle 10, 10*a* to 10*c* may further include the communication device 14. That is, the vehicle 10, 10*a* to 10*c* that can be moved by unmanned driving may not be equipped with at least a part of the interior components such as the driver's seat and the dashboard. In the vehicle 10, 10*a* to 10*c*, at least a part of an exterior component such as a bumper or a fender may not be attached. The vehicle 10, 10*a* to 10*c* may not be fitted with a body shell. In this instance, the remaining components, such as the body shell, may be mounted on the vehicle 10, 10*a* to 10*c* until the vehicle 10, 10*a* to 10*c* is shipped from the factory. Alternatively, the remaining components, such as the body shell, may be mounted to the vehicle 10, 10*a* to 10*c* after the vehicle 10, 10*a* to 10*c* is shipped from the factory with the remaining components, such as the body shell, not being mounted to the vehicle 10, 10*a* to 10*c*. Each component may be attached from any direction, such as the upper, lower, front, back, right or left side of the vehicle 10, 10*a* to 10*c*, may be attached from the same direction, each may be attached from different directions. It should be noted that position determination and the like can be performed in the same manner as in the vehicle 10, 10*a* to 10*c* in the above-described embodiments.

E-10. Other Embodiment 10

The vehicle 10, 10*a* to 10*c* may be manufactured by combining a plurality of modules. The modular means a unit composed of a plurality of components arranged according to a part or a function of a vehicle 10, 10*a* to 10*c*. For example, a vehicle 10, 10*a* to 10*c* may be manufactured by combining a front module, a central module, and a rear module. The front module constitutes the front of the platform. The central module constitutes the central part of the platform. The rear module constitutes the rear of the platform. The number of modules constituting the platform is not limited to three, and may be two or less or four or more. In addition to or instead of the components constituting the platform, components constituting parts of the vehicle 10, 10*a* to 10*c* that differ from the platform may be modularized. Further, the various modules may include any exterior parts such as bumpers and grills, and any interior parts such as sheets and consoles. In addition, the present disclosure is not limited to a vehicle 10, 10*a* to 10*c*, and a moving object of any aspect may be manufactured by combining a plurality of modules. Such a module may be manufactured, for example, by joining a plurality of parts by welding, a fixture, or the like, or may be manufactured by integrally molding at least a part of the parts constituting the module as one part by casting. Molding techniques for integrally molding one part, in particular a relatively large part, are also called gigacasting or megacasting. For example, the front module, the central module, and the rear module described above may be manufactured using gigacasting.

E-11. Other Embodiment 11

Transporting the vehicle 10, 10*a* to 10*c* by using the traveling of the vehicle 10, 10*a* to 10*c* by unmanned driving is also referred to as "self-propelled conveyance". A configuration for realizing self-propelled conveyance is also referred to as a "vehicle remote control autonomous traveling conveyance system". Further, a production method of producing a vehicle 10, 10*a* to 10*c* by using self-propelled conveyance is also referred to as "self-propelled production". In self-propelled manufacturing, for example, at least a part of the conveyance of the vehicle 10, 10*a* to 10*c* is realized by self-propelled conveyance in a plant for manufacturing the vehicle 10, 10*a* to 10*c*.

The present disclosure is not limited to each of the above embodiments, and can be realized by various configurations without departing from the spirit thereof. For example, the technical features of the embodiments corresponding to the technical features in the respective embodiments described in the Summary can be appropriately replaced or combined in order to solve some or all of the problems described above. For example, the technical features of the embodiments corresponding to the technical features in the respective embodiments described in the Summary can be appropriately replaced or combined in order to achieve some or all of the above-described effects. Further, when the technical features are not described as essential in the present specification, these can be deleted as appropriate.

What is claimed is:

1. An information processing device for traveling of a moving object that is movable by unmanned driving, the information processing device comprising a processor configured to:

generate a manual control command based on an operation performed by an operator of an operator input device installed at a place different from the moving object, the manual control command being a command that defines a traveling motion of the moving object;

send the manual control command to the moving object;

determine whether the moving object is in an assistance required state during a period in which the moving object is in a remote manual driving mode, the assistance required state being a state in which the moving object requires travel assistance, and the remote manual driving mode being a mode in which the moving object travels according to the manual control command;

in a case where the moving object is in the assistance required state, determine whether a threshold time period has elapsed since the manual control command is sent to the moving object, in a case where the threshold time period has elapsed, generate an automatic control command and send the automatic control command to the moving object, the automatic control command being a command to cause the moving object to travel without using the manual control command; and in a case where the threshold time period has not elapsed, generate a stop command and send the stop command to the moving object, the stop command being a command to stop the moving object.

2. The information processing device according to claim 1, wherein the processor is configured to calculate a distance between the moving object and an obstacle present at a right-hand side of the moving object, determine whether the distance is less than a threshold, and in a case where the distance is less than the threshold, determine that the moving object is in the assistance required state.

3. The information processing device according to claim 1, wherein the operation input device includes a steering wheel, an accelerator pedal, and a brake pedal.

* * * * *